Figure 1:
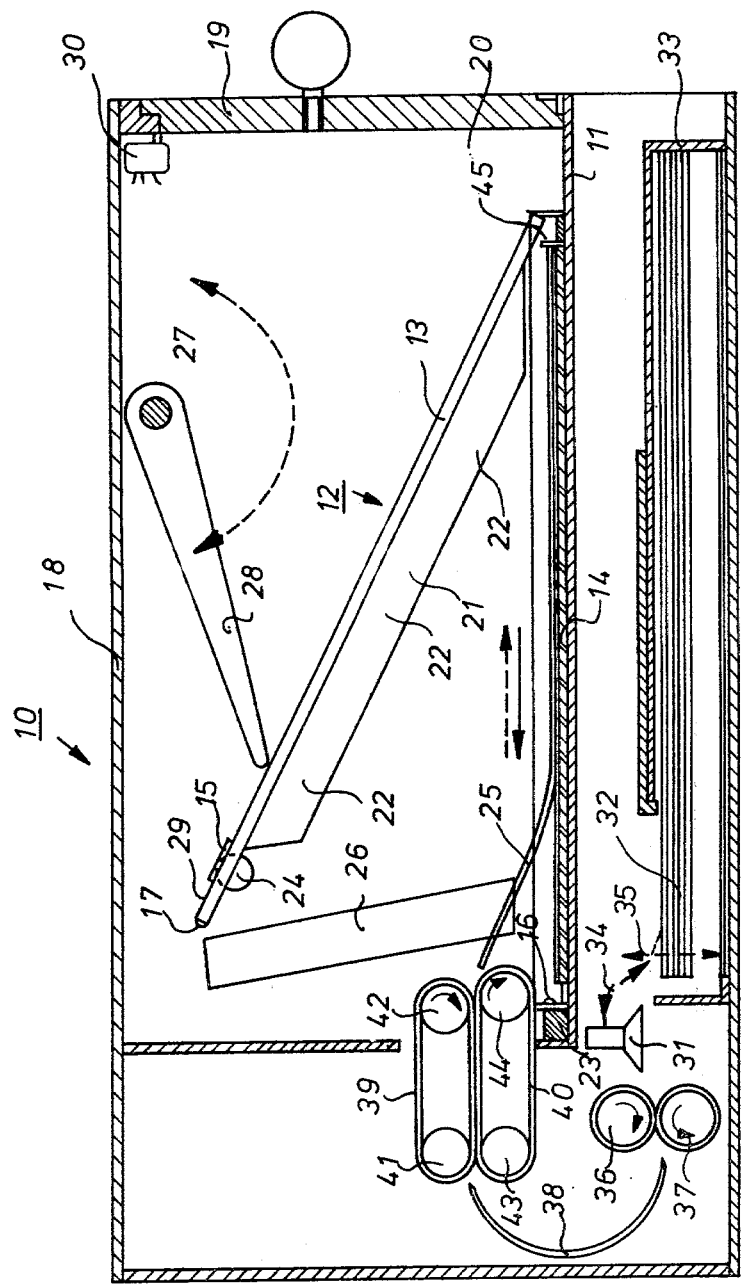

United States Patent [19]

Plessers et al.

[11] 4,227,089
[45] Oct. 7, 1980

[54] APPARATUS FOR OPENING RADIOGRAPHIC CASSETTES

[75] Inventors: Hendrik S. Plessers, Boechout; Julianus J. Hellemans, Kontich, both of Belgium

[73] Assignee: AGFA-GEVAERT N. V., Mortsel, Belgium

[21] Appl. No.: 951,396

[22] Filed: Oct. 16, 1978

[30] Foreign Application Priority Data

Oct. 18, 1977 [GB] United Kingdom ............... 43329/77

[51] Int. Cl.$^2$ .................. G03B 41/16; G11B 1/00
[52] U.S. Cl. ...................................... 250/468; 250/481
[58] Field of Search .............................. 250/468, 481

[56] References Cited

U.S. PATENT DOCUMENTS 3,900,405  8/1975  Bartlett et al. ..................... 250/468
3,916,206  10/1975  Koch et al. .......................... 250/468

Primary Examiner—Alfred E. Smith
Assistant Examiner—T. N. Grigsby
Attorney, Agent, or Firm—William J. Daniel

[57] ABSTRACT

An apparatus for opening radiographic cassettes comprises a housing which may be closed in a light-tight fashion and containing a platform onto which the radiographic cassette is positioned. Also, in the housing is an elongated upwardly inclined cam surface which engages a lip portion projecting from the cover of the cassette. When pushing the cassette further into the housing the cover becomes gradually lifted by the cam action. At a given position the cover is lifted sufficiently open to permit the introduction and removal of unexposed and exposed film into and out of the cassette. A release mechanism, upon actuation, enables the cassette cover to drop thereby closing and relocking the cassette.

The apparatus is suitably incorporated in a daylight system for loading radiographic cassettes with unexposed radiographic films.

10 Claims, 2 Drawing Figures

APPARATUS FOR OPENING RADIOGRAPHIC CASSETTES

This invention relates to a device for manipulating radiographic film cassettes and more particularly with a device permitting a reproducible opening of the cassette cover, an exact positioning of an X-ray film in the cassette and a guaranteed reclosing and locking of the cover after the loading cycle, such as occurs in automatic daylight loading devices used in radiography.

Devices for loading radiographic cassettes in daylight conditions are well known in the art and are marketed already. They generally comprise a light-tight chamber in which is provided a mechanism for gripping the cover of an unlocked but closed cassette, which mechanism is subjected to a movement causing the cover to perform an angular displacement around the cassette hinges. A dispensing mechanism for radiographic film removes the uppermost one of a stack of films and brings it to a transport mechanism which feeds it into the opened cassette. Once the film is loaded, the cassette is withdrawn from the loading apparatus whilst a pressure is exerted upon the cover thereby relocking the cassette.

The mechanism for gripping the cover of the cassette is generally in the form of two or more sucking devices which are able to engage the cover and grip it by application of a suitable vacuum. When loading radiographic cassettes having a pre-tensioned cover which assumes a concave form after unlocking, it may occur that the front edge of the cassette cover touches the sucker cups during the introduction in the loading device. When this happens, a real danger for impairing the mechanism for controlling the movement of the sucker cups exists, so that the faultless functioning of said mechanism is no longer guaranteed.

Some kinds of radiographic cassettes have their cover coated or provided with a polymeric layer of pebbled surface structure for the purpose of facilitating their manipulation and transport in X-ray tables, or during their loading and unloading cycle. If the depth of the pebbling in the surface exceeds a certain limit, it becomes difficult to take hold of the cover by means of a sucker cup because an adequate vacuum is not easy to maintain. Indeed, air leakage cannot be prevented in the recesses between the pebbles into which the mouth of the sucker cups cannot reach.

Prior art daylight loading systems may also show the undesired characteristic that the dispensed film sheet, when being fed into the cassette, is imparted against the rear edge of the cassette bottom and in consequence thereof it may occur that the film sheet bounces back past the front edge of the bottom. In this position the film sheet becomes jammed between the cassette cover and the bottom, so that upon closing and relocking the cassette the sheet is ruined and the locking mechanism of the cassette may be damaged.

The present invention provides a device for opening radiographic film cassettes, which has a construction affording advantages with respect to the reliability of the cassette opening mechanism.

According to the present invention there is provided an apparatus for opening radiographic film cassettes characterised by the provision in a housing of an inclined cam surface or edge which is disposed so as to intrude under a laterally projecting lip portion of a cassette cover as the cassette is advanced relative to said inclined cam surface so that the cassette cover becomes progressively opened during that advance.

In a preferred embodiment of the invention there is provided:

A device for opening radiographic film cassettes provided with at least one projecting lip portion at a side edge of their cover, which device comprises:

a platform onto which a closed radiographic cassette is positioned, a first abutment member against which a side edge of said cassette is positioned when placed on said platform for alignment of said cassette, cam means positioned in a plane normal to said platform, which means comprises an upwardly inclined elongated surface on which said projecting lip portion may at least partly rest so that upon movement of said cassette on said platform the cassette cover is gradually lifted and opened, a second abutment member provided on said platform which arrests and aligns the leading edge of said cassette when the latter has been advanced a predetermined distance on said platform so that said cassette is arrested and aligned in opened condition.

In a preferred embodiment the distance over which said cassette is moved on said platform is greater than the vertical projection on the platform of the distance over which the extending lip portion of the cassette cover is supported by the upwardly inclined supporting member.

The support of the projecting lip portion may then be taken over by a releasable supplementary member preferably in the form of a pin on which the lip portion may rest and which may be pulled away by means well known in the art, for example by an electromagnet. In the latter case, the cassette cover is then no longer retained and drops to close again the cassette. During the closing step a supplementary member may be provided which is also in inclined position and intercepts the downwardly falling cassette cover. In this way the front edge of the cover of the cassette becomes supported during closure and a less abrupt closing of the cover is realized. If desired, the device may be equipped with supplementary cassette unlocking means and this has the capability for opening locked as well as already unlocked cassettes.

When the device is used in a daylight loading system locking means may also be provided in order to hermetically close the cassette.

Figure 2:
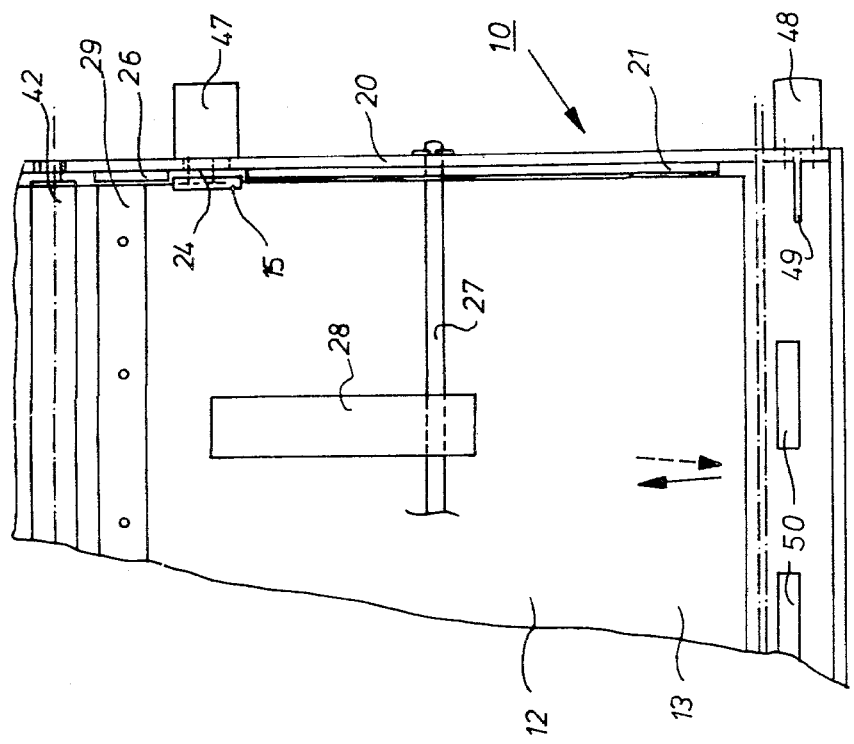

The scope and spirit of the invention will be exemplified by way of the description of a preferred embodiment with reference to following figures, in which:

FIG. 1 is a cross-sectional view of a daylight loader for radiographic film cassettes embodying the invention, and FIG. 2 is a partly top view of the device of FIG. 1.

As may be understood from FIGS. 1 and 2 a loader 10 for dispensing radiographic films in daylight comprises a platform 11 onto which a radiographic film cassette 12 having a cover 13 and a bottom part 14 may be positioned. The radiographic cassette 12 is of conventional design in that the bottom part 14 and the cover 13 are hingedly connected to each other and that a locking mechanism in the form of for example mutually engaging projections 16 and 17 provided at the front edge of the cover 13 and the bottom 14 is provided which may engage and disengage each other, for example a slide, a spring-lock or other means known in the art. The cover 13 is also provided, at least at one of its side edges, with a projection 15 which enables an operator to open the cassette by hand, once it has become unlocked.

The platform 11, on which the cassette 12 is placed, is generally mounted in a housing 18 which may be light-tightly closed by means of a door 19 of sufficient width to permit passage of the cassette during its introduction into and withdrawal from the housing 18.

The upstanding side wall 20 of the housing 18 against which the cassette 12 is positioned is provided with a member 21 provided with an elongated cam member surface on which the projection 15 may be positioned when the cassette is at the entrance of housing 18 during its introduction into the latter. The member 21 may be fixed to the side wall 20 of the housing 18 by means of a plurality of screws or rivets 22 or even by glueing. It is mounted in inclined direction relative to platform 11 and has a length such that its projection on a horizontal plane is smaller than the length of a side edge of the cassette 12. As a consequence of, the engagement of projection 15, on the member 21, the cassette cover 13 is gradually lifted when the cassette is advanced on the platform 11 in the direction of the solid arrow, cover 13 thereby undergoing a pivotal movement relative to the bottom part 14, thereby opening the cassette 12. The advance of the cassette 12 on the platform 11, whether by hand or mechanically, is arrested by abutment of the leading edge of the bottom 14 against a stop 23 which also serves the purpose of aligning the cassette. At that moment, the projection 15 has already passed beyond the upper extremity of cam member 21 and falls downwards over a limited distance onto a retractable pin 24.

After a radiographic film sheet 25 has been introduced into the cassette (the dispensing or loading cycle to be described hereinafter) the pin 24 is retracted (for example by means of an electromagnet 47—see FIG. 2) and the cover 13 falls down until it is arrested by a second cam member 26 analogous to cam member 21 but mounted at a steeper inclination.

This arrangment—apart from an efficient braking of the fall of the cover achieves a rapid and progressive closing of the cassette 12 in that upon its withdrawal from the housing (in the direction of the broken arrow), the cover 13 reaches its downmost position after a displacement over a very small distance.

In order to completely eliminate the risk for fogging of the unexposed radiographic film sheet 25 contained in the now closed but still unlocked cassette 12, suitable locking means are provided. These are in the form of a bar 27 mounted normal to the direction of introduction and withdrawal of the cassette 12 in the side wall 20 of the housing 18 and bearing a plurality of pressure levers 28, which are freely pivotable when no cassette or only a locked one is present on the platform. The length of the pressure levers is such that they, when hanging in vertical position, are, however, capable of engaging behind the reinforcement strip 29 provided at the leading edge of the cover 13 of the cassette 12. As a consequence thereof the pressure levers 28 will act against the resilience of the cassette components, such as the cover 13 and the carriers for the intensifying screens, etc. and will push the cover further in downward direction, so that the locking members 16 and 17 are permitted to snap into engagement with each other. The prelocked cassette can then pass under the pressure levers 28 and may be withdrawn out of the housing 18 without any risk of accidental exposure to daylight of the radiographic film contained therein.

The daylight loading apparatus 10 incorporating the device for opening and relocking radiographic cassettes according to the invention operates as follows: A closed, but unlocked, radiographic cassette 12 is introduced into housing 18, via door 19, and aligned against side wall 20. The projection 15, provided at a side edge of the cover 13 of the cassette, then engages the upper projecting face of the inclined cam member 21 and upon further introduction of the cassette 12 into the housing, the cover 13 is gradually lifted camwise in an upward direction.

Once the leading edge of the bottom 14 of the cassette has reached stop 23, the cassette is arrested. At that moment the support for projection 15 has shifted to retractable pin 24. The arrival of the cassette at this resting position may, if desired, be signalled by suitable signalling means (not shown)in order to indicate that the cassette is in correct loading position.

The closing of door 19, after the cassette 12 has been fully introduced into the apparatus actuates microswitch 30 which starts the loading cycle.

By means of an appropriate mechanism (not shown) the sucker cup 31 (or a plurality thereof) seizes the leading edge of the uppermost sheet of a stack 32 of radiographic film sheets located in a magazine 33. The sucker cup performs a composite cycle of movements as indicated by the arrows 34 and 35 and introduces the leading edge of the uppermost sheet into the nip of a pair of transport rollers 36,37 which feed the sheet via the curved guide 38 towards a pair of endless belts 39,40, supported by rollers 41,42 resp. 43,44. Rollers 42 and 44 are located in parallel relation to each other and to the leading edge of the bottom 14 of cassette 12. In comparison with roller 42, roller 44 is displaced towards the rear (or hinged) edge of cassette 12 in such a way as to guarantee that a freshly dispensed radiographic film sheet 25 is advanced towards the rear edge of frame 45 of the bottom 14 and that, moreover, the driving force exerted constantly by roller 44 maintains the position of the radiographic film sheet against edge 45 so that an occasional rebound and thus mis-positioning of the film sheet 25, is avoided.

As may be seen further from FIG. 2, the retraction of pin 24 is controlled by electromagnet 47.

According to FIG. 2, there is illustrated that another electromagnet 48 and associated retractable pin 49 may be provided nearer to the entrance opening of the cassette loader 10.

This serves the purpose of preliminarily unlocking the cassette 12 when it is introduced into the apparatus for loading purposes. In order to perform the unlocking cycle in a reproducible manner, the cassette is firstly arrested by one or a plurality of retractable stop elements 50 intended for alignment purposes. After finishing this step in a correct way, electromagnet 48 may be energized thereby pressing pin 49 against a part of the locking mechanism of the cassette so that the latter may be position unlocked position. Such locking/unlocking systems have not been illustrated as they are sufficiently known in the art. After the cassette has become unlocked, the opening, loading, re-closing and relocking is performed as described hereinbefore.

The ergonomic properties of the device may be enhanced by suitable control lights or signals which are energized or generated each time a phase of the loading cycle of the cassette is initiated or completed. The generation and display of such control signals may be carried out by any known means, but as such means form no part of the invention, they have not been illustrated or described in detail.

It will be clear that instead of being used in association with a daylight loading device for radiographic cassettes, the cassette opening mechanism according to the invention may also be incorporated in daylight unloaders or intermediate unloaders for the same cassettes.

It will also be clear that, if desired, the platform onto which the cassette is positioned may be movable, so that no sliding movement between the cassette bottom and the platform is necessary, as the cassette may be moved together with the platform as a whole.

We claim:

1. An apparatus for opening radiographic film cassettes which comprises a housing and in said housing a platform for the introduction and withdrawal of the radiographic cassette into and from said housing, guide means for engaging a longitudinal edge of said cassette for aligning the cassette relative to said platform during its introduction, stop means for precluding further movement of the cassette when it has advanced to a predetermined location in said housing, and a cam surface is inclined inwardly relative to said platform with its lowermost end in the path of a laterally projecting lip portion of a cassette cover as the cassette is advanced relative to said inclined cam surface so that the cassette cover becomes progressively opened during its introduction into the housing.

2. An apparatus according to claim 1, in which the length of the vertical projection of the cam member on the horizontal plane is smaller than the horizontal distance over which a cassette has to travel following contact of its lip portion with the lowermost end of said cam surface in order to reach said predetermined position and including a releasable cover supporting means disposed inwardly of the uppermost end of said cam surface to maintain the raised cover in open condition after passage of said projection clear of the uppermost cam end, and means operable to release said support means.

3. An apparatus according to claim 2, in which said releasable support means is a retractable pin or other projection engaging when protracted the projecting cover lip portion.

4. An apparatus according to claim 1 including a cover supporting surface of steeper inclination than said cam surface, and against which the cassette cover rides during retraction of the cassette to determine the rate of such closure.

5. An apparatus according to claim 1, wherein said housing is capable of being light-tightly closed.

6. An apparatus according to claim 1, which further comprises a pair of at least partly superimposed endless film-feeding belts located in front of and in parallel with the leading edge of the bottom of said cassette and with each other.

7. An apparatus according to claim 6, in which the lower one of said pair of endless belts extends closer to said leading edge of said cassette bottom than the upper one.

8. An apparatus according to claim 1, wherein the cassette includes engageable locking means and which further comprises a means for re-locking the closed cassette.

9. An apparatus according to claim 8, wherein said cassette locking means includes cooperating detent means on the cover and cassette body, and said re-locking means comprises a bar extending in parallel relationship over said platform and mounted on said bar for free pivotal movement at least one pressure lever having a length capable of exerting a biasing pressure upon the cover of said cassette so as to bring said cooperating detent means into locking position.

10. An apparatus according to claim 8, which further comprises means to unlock a cassette being introduced into said housing before the projecting cover lip portion engages the lowermost end of said upwardly inclined cam surface.

* * * * *

UNITED STATES PATENT OFFICE
CERTIFICATE OF CORRECTION

Patent No. 4,227,089      Dated October 7, 1980

Inventor(s) Hendrik S. Plessers et al

It is certified that error appears in the above-identified patent and that said Letters Patent are hereby corrected as shown below:

In the Claims:

Claim 1, line 10, -- and upwardly -- should be inserted after "inwardly".

Signed and Sealed this

Tenth Day of February 1981

[SEAL]

Attest:

Attesting Officer

RENE D. TEGTMEYER

Acting Commissioner of Patents and Trademarks